3,057,811
SELF-INSOLUBILIZING MINERAL PIGMENT COATING COMPOSITIONS FOR PAPER COMPRISING A WATER-SOLUBLE ANIONIC POLYMER ADHESIVE AND A WATER-SOLUBLE ALUM-SEQUESTERING AGENT COMPLEX
Harold Trachtenburg, Stamford, and Daniel D. Ritson, Riverside, Conn., assignors to American Cyanamid Company, New York, N.Y., a corporation of Maine
No Drawing. Filed Apr. 25, 1958, Ser. No. 730,801
6 Claims. (Cl. 260—29.6)

The present invention relates to coating compositions. More particularly, the present invention relates to fluid aqueous coating compositions essentially composed of a paper coating pigment, a synthetic water-soluble anionic adhesive adapted to bond the particles of the pigment to the cellulose web, and a latent insolubilizing agent which irreversibly converts the adhesive to water-insoluble form when the coating is applied to a cellulosic web and dried.

The compositions of the present invention are adapted to produce a smooth glossy coating on calendered water-laid cellulosic webs including but not limited to paper. For brevity, but only for brevity, they will be termed "paper coating compositions."

In the past, coated paper has been manufactured by applying a coating composition chiefly composed of a paper coating pigment such as clay in aqueous suspension containing a water-soluble adhesive, typically starch. These adhesives bonded the pigment particles firmly to the paper when dry, but lost virtually all their adhesive action in the presence of moisture.

More recently, synthetic anionic adhesives have been employed in place of all or part of the starch, and a substantial advance in the art resulted when it was found that the coatings could be insolubilized by treatment of the coated paper with a dilute aqueous solution of a polyvalent metal salt or by other chemical reaction; cf. Azorlosa U.S. Patents Nos. 2,661,308 and 2,661,309, granted on December 1, 1953, and Azorlosa U.S. Patent No. 2,616,818, granted on November 4, 1952. The insolubilizing treatment constituted a separate step in the production of the paper, and thus introduced an additional element of trouble and cost. The present invention is an improvement over the inventions disclosed in the patents referred to.

Up to the present it has not been found possible to add an insolubilizing metal salt to aqueous coating compositions containing a water-soluble synthetic anionic adhesive because the action of the metal salt is practically instantaneous and converts the composition to stiff gel form before it can be applied to the paper.

The discovery has now been made that fluid aqueous mineral pigment coating compositions containing a water-soluble anionic linear carbon chain polymer as principal adhesive component for the mineral pigment are self-insolubilizing when they contain the polyvalent metal salt as a water-soluble complex with a sequestering agent. The composition is stable until used. However, when the composition is applied to paper and dried, the normally water-soluble polymer firmly bonds to the pigment particles and simultaneously develops substantial water resistance. Evidently the sequestering agent loses its complexing affinity for the polyvalent metal salt as it dries, permitting the polyvalent metal to react substantially irreversibly with the anionic polymer. However, the precise method by which the insolubilizing action takes place is not known, and we do not wish to be bound by any theory.

The coating compositions of the present invention have substantially the same viscosity as corresponding coating compositions containing none of the alum-sequestering agent. They may be applied to paper in any convenient way. The coated paper may be dried at any convenient temperature from room temperature up, slightly better wet rub resistance being obtained when the drying is performed at temperatures in the range of 200°–225° F. as compared with room temperature.

Mineral pigments suitable for use in coating compositions of the present invention include papermakers' clay, titanium dioxide, calcium carbonate, talc and barium sulfate, and amount to about 30%–60% based on the weight of the composition.

As pigment adhesive, suitable polymers include the materials formed by copolymerizing acrylamide with acrylic acid in weight ratio between about 95:5 and 60:40; by copolymerizing vinyl acetate with ethyl acrylate in weight ratio between about 95:5 and 60:40 followed by hydrolysis to form a polymer carrying hydroxyl and carbonyl groups; and by interpolymerizing acrylamide, acrylonitrile, and methacrylic acid in weight ratio between about 90:5:5 and 70:15:15. Evidently any water-soluble anionic linear carbon chain polymer is suitable. Additional anionic adhesives suitable for the purpose are shown in the Azorlosa patents referred to above. The invention does not depend upon the particular polymer employed. It is preferred that the number of acid groups in the polymer be between 5 and 20% of the number of linear carbon chain atoms thereof.

Enough of the polymer is used to act as an effective adhesive for the pigment. The optimum amount in each instance is most easily found by trial as it depends on such independent variables as the average particle size of the pigment and the specific bonding properties of the pigment and the adhesive. About 5% to 20% of adhesive is used based on the weight of the pigment.

It is within the scope of the invention to employ other non-ionic or anionic adhesives in minor amount with the synthetic linear carbon chain adhesive to which the invention is directed. Suitable supplementary adhesives include starch, gum arabic, soya protein, polyvinyl alcohol, glue, carboxymethyl cellulose, casein, and mixtures of the foregoing.

The latent insolubilizing component is an aqueous solution of a polyvalent metal salt complexed with a sequestering agent and is formed simply by mixing the sequestering agent with the polyvalent metal salt in the presence of water as diluent. The complex proceeds rapidly if not instantaneously and no more than about 5 minutes is required. The invention includes the use of the water-soluble salts and hydroxides of iron (ferrous and ferric), copper, calcium, magnesium and chromium. Alum is preferred as it is cheap, non-toxic, causes no discoloration, and develops very good wet-rub resistance.

Sequestering agents are complexing or chelating compounds which form a water-soluble complex with a metal salt preventing its immediate reaction; see article on "Sequestering Agents" in vol. 12 of Kirk-Othmer's "Encyclopedia of Chemical Technology." They are generally polycarboxy acids of the types shown in the appended examples, but certain monocarboxylic acids are also suitable. They reach optimum effectiveness at particular pH ranges. These ranges vary from agent to agent and are thus most easily found by trial. Where in this specification the sequestering agents are referred to as acids, their use in the form of alkali metal or other soluble salts is included.

Compositions having a pH between 8 and 10 are preferred.

The amount of sequestered alum to be added to the coating composition depends on the amount of water-resistance which it is desired to impart to the finished coating, and this depends in substantial part on the proportion of carboxylic acid groups in the polymer and the temperature at which the cellulose web is dried. Accordingly, this amount is likewise most conveniently found by trial.

The coating compositions of the present invention are not limited to the foregoing components but may contain colorants, for example, ultramarine blue and phthalocyanine blue and red; mildew preventatives, perfumes, and such other materials as are generally present in coating compositions.

The invention will be more particularly illustrated by the examples which follow. These examples constitute specific embodiments of the invention and are not to be construed as limitations thereon.

*Example 1*

The following illustrates a preferred embodiment of the present invention.

A water-soluble anionic linear carbon chain polymer adhesive was prepared by copolymerizing 100 gm. of an 88:12 by weight acrylamide:acrylic acid mixture dissolved in 125 ml. of water using as catalyst 0.25 g. of ammonium persulfate in 225 ml. of deionized water. The two solutions were allowed to flow into a reaction flask containing 550 cc. of water at 70° C. at the rate of about 3 ml. per minute and were reacted at 80°–85° C. for a total of four hours. The ratio of amide groups to carboxyl groups in the polymer was estimated to be about 85:15 as the result of hydrolysis of amide groups during polymerization. The solids content of the product was adjusted to 15% by addition of water, and the pH adjusted to 6.5

A hydrophilic mineral pigment slip was prepared by dispersing 503 gm. of HT coating clay (a kaolinite paper-coating clay) in 230 cc. of deionized water containing 1 gm. of sodium carbonate and 1 gm. of sodium hexametapohsphate as dispersing acids. The mixture was stirred for 90 minutes and sieved through a 200-mesh screen to remove lumps. Iit contained 68.6% solids by weight.

A coating composition was formed by stirring 333.3 gm. of the 15% polymer solution into the pigment slip, plus enough water (approx. 36 cc.) to adjust the total solids content to 50% (total weight 1104 gm.; weight of polymer 50.0 gm.). A number of 100 gm. portions each thus containing 4.5 gm. of polymer were withdrawn. One portion was reserved as control and to this nothing was added.

To one of the portions was added 10 gm. of a 10% alum solution with stirring. The composition set to a rigid gel almost instantly, and was discarded.

A solution containing 18.7% by weight of latent insolubilizing agent was prepared by adding 22 gm. of a 47% aqueous solution of sodium N,N-di(2-hydroxyethyl) glycinate as sequestering agent slowly to 84.0 cc. of a 10% aqueous alum $[Al_2(SO_4)_3 \cdot 14H_2O]$ solution, so that the weight ration of the alum to the sequestering agent was 1:1.3.

The complexed alum solution was then stirred into the coating composition portions in amounts shown in the table below. The viscosity of the compositions remained substantially constant or decreased slightly, and the compositions did not tend to gel even when the proportion of complexed alum was stoichiometrically in excess of the amount calculated as needed to react with the carboxyl groups of the polymer.

The foregoing compositions were applied at a thickness corresponding to 12 lb.–15 lb. per 25" x 36"/500 ream to coating raw stock using a 0.0005" Bird knife applicator, after which the sheets were dried and tested for their wet-rub resistance according to a standard laboratory method wherein the test sheet after conditioning at room temperature is placed on a black sheet and rubbed with a moistened thumb, so as to transfer the coating removed to the underlying black sheet. The results are reported on a scale of 10 in which 0 designates rapid and extensive removal of the coating, 10 designates no removal of the coating, and intermediate values designate proportional amounts removed. Control sheets were made by use of the control coating composition, and a number of the control sheets were dipped in aqueous 1% alum until the polymer set. The control sheets were dried and tested as described. Results are as follows.

| No. | Alum-Sequest. Agent Complex | | Brookfield Visc. | Sheet Treatment | Wet Rub Test |
|---|---|---|---|---|---|
| | Gm. Added [1] | Percent of Polymer | | | |
| 1 | None | | 8,400 | Dried [3] | 1 |
| 2 | None | | 8,400 | Dip in 1% alum, dried [3] | 9 |
| 3 | 12.3 | 515 | 7,480 | Dried [3] | 6 |
| 4 | 24.6 | 103.0 | 6,800 | ....do.... | 8 |
| 5 | 36.0 | 154.5 | [2] 6,800 | ....do.... | 9+ |

[1] To coating composition.
[2] Estimated.
[3] At 220° F. for one minute.

*Example 2*

The following illustrates the preparation of coating compositions using other sequestering agents.

The procedure of Example 1 was repeated, except that the polymer of Example 1 was replaced by the polymer formed by copolymerizing acrylamide, acrylonitrile and methacrylic acid in 85:5:10 weight ratio, and the clay contained 10% by weight of titanium dioxide pigment as opacifier.

In each instance the amount of sequestering agent used was between 0.8 and 1.2 of the weight of the alum (calculated as the tetradecyl hydrate) in the solution experience having shown that this amount is sufficient to sequester substantially all of the alum without preventing the alum from acting as insolubilizing agent when the coating is dried. The amount of alum was 20% to 25% of the weight of polymer solids.

The coatings were applied to paper and tested as described under Example 1. Results are as follows.

| No. | Sequestering Agent | Wet Rub Test |
|---|---|---|
| 1 | Ethylenediamine tetraacetic acid | 4 |
| 2 | Nitrilotriacetic acid | 9 |
| 3 | N'-2-Hydroxyethyl-ethylenediamine-N',N², N²-triacetic acid | 10 |

Example 3

The following illustrates the effectiveness of other sequestering agents.

In each instance 1 gm. of the sequestering agent was dissolved in 10 cc. of water, after which the solution was slowly added to 7.18 cc. of 10% solution of alum (as the tetradecyl hydrate) in water, forming a soluble alum-sequestering agent complex. There was then added 10 cc. of a 10.5% aqueous solution of a polymer corresponding to that of Example 1 except that the ratio of amide groups to carboxyl groups in the polymer was 90:10.

The resulting clear solutions were then added to clay slip corresponding to that of Example 1.

Details of the preparation are as follows.

| Component | Run No. | | | | | |
|---|---|---|---|---|---|---|
| Sequestering Agent | 1 | 2 | 3 | 4 | 5 | 6[1] |
| Citric acid, gm | 1.0 | | | | | |
| Sodium citrate, gm | | 1.0 | | | | |
| Tartaric acid, gm | | | 1.0 | | | |
| Sodium oxalate, gm | | | | 1.0 | | |
| Oxalic acid, gm | | | | | 1.0 | |
| Water, cc | 10.0 | 10.0 | 10.0 | 10.0 | 10.0 | 10.0 |
| Alum (10% soln.), cc | 7.18 | 7.18 | 7.18 | 7.18 | 7.18 | 7.18 |
| Polymer (10.5% soln.), cc | 10.0 | 10.0 | 10.0 | 10.0 | 10.0 | 10.0 |
| Viscosity: Of polymer solution [2] | Fluid | Fluid | Fluid | Fluid | Fluid | ([3]) |
| Of final coating composition | Fluid | Fluid | Fluid | Fluid | Fluid | |

[1] Control.
[2] After addition of alum-sequestering agent complex (Runs 1-5) or after addition of alum solution (Run 6).
[3] Rigid gel.

The coating colors of runs 1–5 inclusive were applied to paper in accordance with the method of Example 1 and gave satisfactory wet rub test results.

Example 4

The following illustrates one method for determining the amount of sequestering agent needed to form a fluid coating composition which sets to a water-insoluble form on drying.

A series of coating colors was prepared according to the general method of Example 1. The alum-sequestering agent solutions were prepared by the method of Example 3 employing in each instance 4.5 cc. of 10% aqueous alum solution having dissolved therein the amounts of sodium N,N-di-(2-dihydroxyethyl) glycinate (DHEG) shown in the table below. In each instance 20 cc. of a 15% by weight aqueous solution of the polymer of Example 1 was employed, and to this was added 10 cc. of the alum of or the alum-sequestering agent shown in the table.

The solutions obtained in runs 1–4 inclusive were too viscous to use. The solutions of runs 5 and 6 were made into a coating color according to Example 1. The viscosity of these coating colors were satisfactory.

Details of the procedure employed and the results obtained are tabulated as follows.

| Component | Run No. | | | | | |
|---|---|---|---|---|---|---|
| Sequestering Agent | 1 | 2 | 3 | 4 | 5 | 6 |
| Alum, 10% soln, cc | 4.5 | 4.5 | 4.5 | 4.5 | 4.5 | 4.5 |
| DHEG, 47% aq., gm | | 0.52 | | | | |
| Do, gm | | | 0.78 | | | |
| Do, gm | | | | 1.05 | | |
| Do, gm | | | | | 1.31 | 2.62 |
| Alum: DHEG ratio | | 1:0.6 | 1:0.8 | 1:1.1 | 1:1.37 | 1:2.74 |
| Polymer, 15K soln, cc | 20 | 20 | 20 | 20 | 20 | 20 |
| Visc. of soln.[1] | ([2]) | ([2]) | ([2]) | ([3]) | Fluid | Fluid |

[1] After addition of alum-sequestering agent complex.
[2] Stiff gel.
[3] Semi gel.

Example 5

The procedure of run 6 of Example 4 was repeated, except that titanium dioxide was used as the pigment in place of the clay. Results were substantially the same.

We claim:

1. A fluid aqueous paper coating composition consisting essentially of a water-insoluble hydrophilic inorganic mineral pigment as coating component; a water-soluble anionic linear carbon chain polymer adhesive therefor; and a water-soluble complex of alum with a sequestering agent as latent insolubilizing agent for said adhesive.

2. A composition according to claim 1 wherein the mineral pigment is papermakers' clay.

3. A composition according to claim 1 wherein the number of acid groups in the polymer is between 5% and 20% of the number of linear carbon chain atoms thereof.

4. A composition according to claim 1 wherein the sequestering agent is N'-2-hydroxyethyl-ethylenediamine-N',$N^2$,$N^2$-triacetic acid.

5. A composition according to claim 4 having a pH between 8 and 10.

6. A fluid aqueous paper coating composition comprising papermakers' clay as coating component; a water-soluble copolymer of acrylamide with acrylic acid in weight ratio between 90:10 and 60:40 as adhesive therefor; and a water-soluble complex of alum with N,N-di-(2-hydroxyethyl) glycine as latent insolubilizing agent for said copolymer.

References Cited in the file of this patent

UNITED STATES PATENTS

| | | |
|---|---|---|
| 2,648,592 | Stanton | Aug. 11, 1953 |
| 2,661,309 | Azorlosa | Dec. 1, 1953 |
| 2,834,759 | Austin | May 13, 1958 |
| 2,904,526 | Uelzmann | Sept. 15, 1959 |

FOREIGN PATENTS

| | | |
|---|---|---|
| 970,321 | France | Jan. 3, 1951 |

OTHER REFERENCES

Fainer et al.: "Analytical Chemistry," volume 24, No. 3, March 1952, pages 515–517.

Dow: "Keys to Chelation," Dow Chemical Company, Midland, Michigan, March 1957, pages 1–9.

Sneed et al.: "Comprehensive Inorganic Chemistry," vol. 5, D. Van Nostrand Company, Princeton, New Jersey, page 20.

Bailar: "The Chemistry of Coordination Compounds," Reinhold Publishing Company, New York, 1956, pages 220–252 relied on.

UNITED STATES PATENT OFFICE

CERTIFICATE OF CORRECTION

Patent No. 3,057,811                              October 9, 1962

Harold Trachtenburg et al.

It is hereby certified that error appears in the above numbered patent requiring correction and that the said Letters Patent should read as corrected below.

Column 2, line 28, for "carbonyl" read -- carboxyl --; column 3, line 59, for "Iit" read -- It --; column 4, line 2, for "ration" read -- ratio --.

Signed and sealed this 11th day of February 1964.

(SEAL)
Attest:

ERNEST W. SWIDER
Attesting Officer

EDWIN L. REYNOLD
Acting Commissioner of Patents